Aug. 25, 1970     W. F. COENEN, SR     3,525,130
SWIFTLY RELEASABLE LOCKING DEVICE, ESPECIALLY ADAPTED TO FASTEN
THE FREE END OF A SAFETY TO A FIXED SUPPORT
Filed Oct. 16, 1968     3 Sheets-Sheet 1
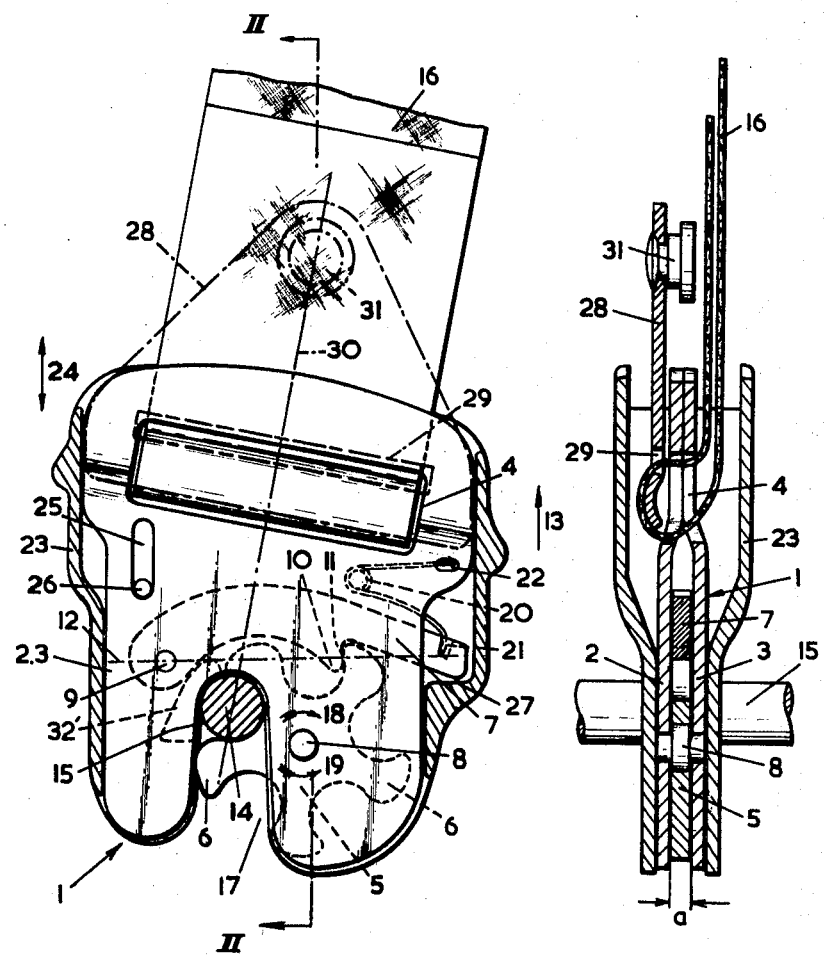

Aug. 25, 1970 W. F. COENEN, SR 3,525,130
SWIFTLY RELEASABLE LOCKING DEVICE, ESPECIALLY ADAPTED TO FASTEN
THE FREE END OF A SAFETY TO A FIXED SUPPORT
Filed Oct. 16, 1968 3 Sheets-Sheet 2
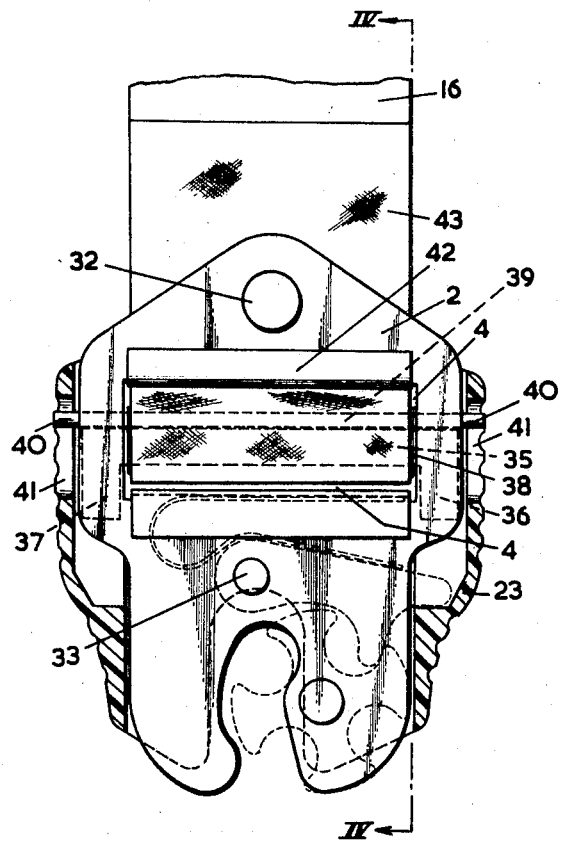
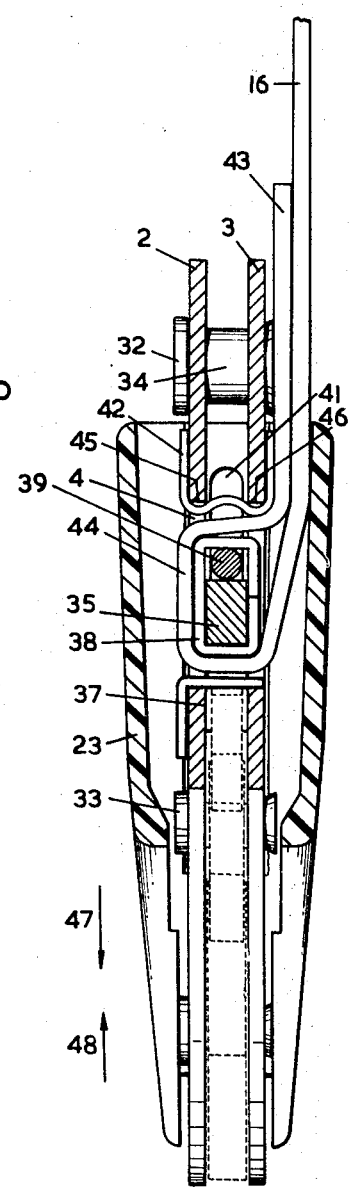

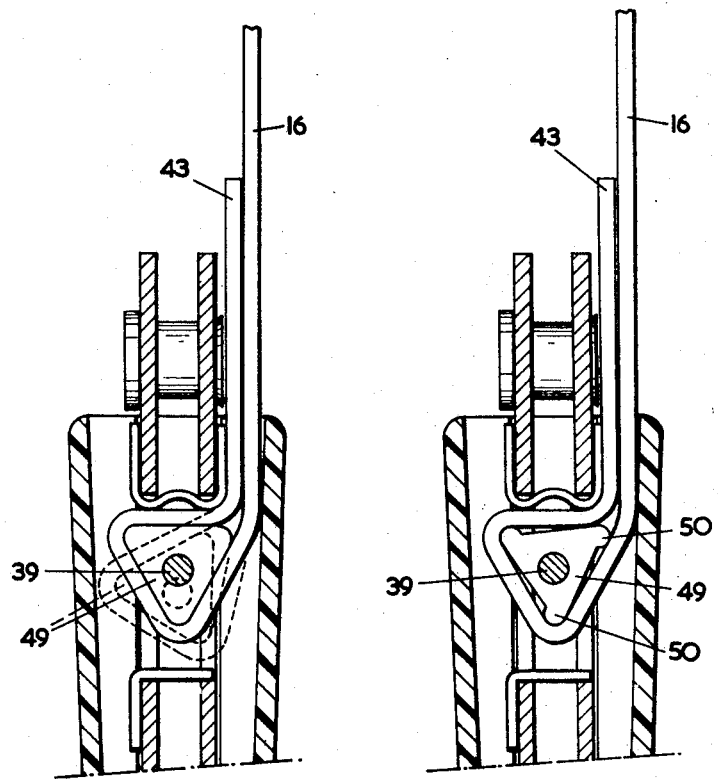

United States Patent Office 3,525,130
Patented Aug. 25, 1970

3,525,130
SWIFTLY RELEASABLE LOCKING DEVICE, ESPECIALLY ADAPTED TO FASTEN THE FREE END OF A SAFETY TO A FIXED SUPPORT
Willem Frans Coenen, Sr., Prinses Marielaan 26, Wassenaar, Netherlands
Filed Oct. 16, 1968, Ser. No. 767,984
Claims priority, application Netherlands, Oct. 18, 1967, 6714145; Sept. 19, 1968, 6813423
Int. Cl. A44b 11/00
U.S. Cl. 24—230
8 Claims

ABSTRACT OF THE DISCLOSURE

A locking device for fastening the loose end of a safety belt to a fixed support in a motor vehicle, including a bearing plate with a hook-shaped member rotatably mounted thereon, spring-loaded pawl means for locking and unlocking said member, and a reciprocable casing accommodating the mechanism and having an abutment acting on the free end of said pawl means, the hook-shaped member being a rotary wheel with a plurality of equally though specially shaped teeth, of which each time one tooth is in engagement with an inlet slot for said support in the bearing plate and grips said support, said pawl means having a locking action on another tooth by means of a cam.

---

The present invention relates to a swiftly releasable locking device, especially adapted to fasten the free end of a safety belt to a fixed support, such as a bow in a motor vehicle or the like, including a bearing plate with at least one hook-shaped member rotatably mounted thereon, said member being lockable and unlockable by spring-loaded pawl means adapted to swivel on a fixed point on said bearing plate, and including a casing accommodating the mechanism thus formed, which casing can reciprocate relative to said bearing plate in the direction of the belt and is provided with an abutment acting on the free end of said pawl means in the unlocking direction thereof.

A locking device of this type is known.

In one embodiment of this known type the fixed bow cannot be readily released after the pawl has been moved against the action of the spring, because the bearing plate has a hook-shaped portion disposed obliquely to the direction of release and necessarily cooperating with the pawl to hold the bow in the locked position, and the bow must slide along said hook-shaped portion in the unlocked position.

In a further embodiment the forces necessary to effect unlocking are so great that a swift release is out of the question.

In still a further embodiment there are provided two portions adapted to swivel toward or away from each other and each provided with a recess corresponding with half the cross-section of the bow. Premature release of the spring-loaded pawl acting on the said parts causes an idle closing of the locking device, which device is difficult to return to the unlocked position to grip the bow actually.

It is an object of this invention to obviate the above drawbacks. To this end the swiftly releasable locking device according to this invention is so constructed that the hook-shaped member is designed as a rotary wheel with a plurality of equally though specially shaped teeth, of which each time one tooth is in engagement with an inlet slot for the bow in the bearing plate and grips said bow, and the pawl by means of a cam may have a locking action on another tooth, so that the cam of the relevant tooth is released by displacement of the casing in a direction away from the bow and that rotation of the rotary wheel in an opposite sense with respect to the fastening of the end of the belt causes the bow to be released.

It is achieved thereby that the bearing plate can be provided with a straight inlet slot which swiftly releases the bow in the case of unlocking, while the teeth of the rotary wheel and the positioning thereof relative to the inlet slot is such that each tooth, on account of its shape, firmly grips the bow in cooperation with the straight edges of the slot.

In addition the locking device according to the invention may be constructed so that the bearing plate has two spaced walls, with the pawl, the spring loading same, and the rotary wheel mounted within the space between the walls of the bearing plate.

Thus a firm and compact structure is obtained, which has the additional advantage that it causes a symmetrical interplay of forces so as to prevent the main surface of the bearing plate from taking an oblique position relative to the plane of the belt upon the occurrence of stresses in said belt.

Furthermore the locking device according to this invention, wherein the bearing plate has a straight slot for the passage of a folded end of the belt therethrough, may be so constructed as to permit a crossbar to extend through said slot, which bar is in engagement with a W-shaped plate mounted on the edges of the slot facing the belt, and which is movable relative to said slot in the direction of the belt by means of the casing through a lost motion device, the arrangement being such that pulling the casing of the unlocked locking device causes the belt passed over the crossbar to move so as to be lengthened or shortened.

Two embodiments of the invention will now be described, by way of example, with reference to the accompanying drawings, in which:

FIG. 1 is a view of the locking device in a first embodiment according to this invention;

FIG. 2 is a section taken along the line II—II in FIG. 1;

FIG. 3 is a view corresponding with FIG. 1, but now of a second embodiment according to this invention;

FIG. 4 is a section, on an enlarged scale, taken along the line IV—IV in FIG. 3; and FIGS. 5a, 5b show the same sectional view as FIG. 4, but now with a different embodiment of the crossbar.

First reference is made to FIGS. 1 and 2.

The locking device consists of a double-wall bearing plate, designated as a whole by numeral 1, the configuration of the section of the walls 2 and 3 being clearly shown in FIG. 2. The bearing plate may, for example, be made of sheet metal. As seen in FIG. 2, the upper ends of the walls are secured together and have provided there a slot 4 of substantially rectangular shape (see FIG. 1), the position of which will be explained hereinafter. Adjacent the lower end of said slot the walls first diverge and then continue so as to be spaced a distance $a$ in parallel relationship to each other. This distance corresponds with the thickness of a ratchet wheel 5 to be accommodated between said walls and having specially shaped teeth 6 (in this embodiment five of them) and a pawl 7. The ratchet wheel 5 is mounted for free rotation on a stud 8 which has its ends fixed in the walls 2 and 3, respectively. The pawl 7 has one end mounted for free swivelling movement on a pin 9 which has its ends likewise accommodated in the walls.

The pawl 7, at the side facing the ratchet wheel, has a projection 10 the active surface 11 of which is normal or substantially normal to the chain-dotted line 12 drawn through the middle of the pin 9 and the middle of the said surface. In other words, the active surface 11 virtually points to the direction of pull as indicated by arrow 13.

FIG. 1, in which the parts of the ratchet wheel covered by the wall 2 and the pawl are shown in dashes, shows the shape of the ratchet teeth. This shape conforms to the circular configuration of the cross-section 14 of a bow section 15 with which the fastening must co-operate. The bow section 15 is part of a bow (not shown) attached to the floor or the like of the vehicle.

In the position shown in FIG. 1 the projection 10 of the pawl locks or blocks one of the teeth of the ratchet wheel, whilst the bow section is in engagement with two successive teeth of the ratchet wheel. Without a lifting of the pawl, the end of especially a hip belt 16 cannot be pulled loose.

For the bow section in the fastening to be brought into the position shown in FIG. 1 either wall is provided with a recess 17. If the fastening is slid over the bow section, the ratchet wheel rotates in the direction of arrow 18 by contact of one of the teeth. If the pawl 7 is lifted (in the direction of arrow 13), the ratchet wheel rotates in opposite sense in the direction of arrow 19 owing to the end of the belt being pulled loose, likewise in the direction of arrow 13.

To ensure that the pawl, by means of its projection 10, automatically blocks or locks each passing tooth of the ratchet wheel rotating in the direction of arrow 18 against rotation in the direction of arrow 19, there is provided a torsion spring 20 one leg of which engages with the free end 21 of the pawl and the other leg is supported in an opening 22 in the wall 2 or 3.

Consequently the pawl can only be lifted if the force of spring 20 is overcome.

To facilitate this lifting and to have it realized more or less automatically in cases of emergency the bearing plate 1 is enclosed by a casing 23 of which the cross-sectional shapes are disposed in two mutually perpendicular planes according to FIGS. 1 and 8. The casing can be displaced relative to the bearing plate according to the double arrow 24, the path of displacement being defined by a slot 25 into which a pin 26 of said casing extends.

On the side of the free pawl end the casing 23, which is preferably made of synthetic material, has a shoulder surface 27 against which said pawl end 21 constantly abuts.

Now if the end 16 of the belt is to be released from the bow section 15, it is sufficient to put one's hand around the casing 23 and to pull in the direction of arrow 13.

The casing first moves relative to the bearing plate, whereby to lift the pawl, and then the ratchet wheel can rotate in the direction of arrow 19 so that the bow section 15 is released. So the advantage of the present invention consists in the effect that the casing must be moved in the same direction as that in which the belt must be released.

Reverting to the slot 4, through which the folded end of the belt is inserted (see FIG. 2) and fixed in a conventional manner by means of a plate 28 with slot 29, said plate 28 being movable relative to the bearing plate, its position is such that the axis 30 of the belt extends through the centre of the slot, normal to its longitudinal direction and through the centre of the cross-sectional area 14 of the bow. Thus a most favourable interplay of forces between the fastening and the bow is obtained.

The plate 28, which in itself does not form part of the present invention, may be provided with a knob 31 on which, for example, the end of a shoulder belt may be hooked.

Between the walls of the bearing plate there may further be provided a piece of rubber (32') to prevent rattling of the fastening against the bow in the position shown in FIG. 1.

Now reference is made to FIGS. 3 and 4.

On the side of the belt 16 the bearing plate, which is composed of two spaced parallel walls 2 and 3, is provided with a slot 4 for the belt to be passed therethrough. Mounted in this region so as to be movable between the walls 2 and 3, which are united by rivets 32 and 33 with spacer sleeves 34, is a U-shaped crossbar with a base portion 35 and legs 36, 37. These legs act as guide means during movement of the base. The base portion of the crossbar is surrounded by a sleeve 38 of rectangular or oval cross-sectional shape by which a pin 39 is clampingly pressed to some extent against said bar. The pin 39 is longer than the length of the base portion 35, so that the ends 40 of the pin project from either side and extend into longitudinal slots 41 of the casing 23.

Mounted on the side of the slot 4 facing the belt, and hence on the side away from the locking mechanism, is a W-shaped section 42 bridging the space between the walls 2 and 3.

The belt 16 is passed over the sleeve 38, numeral 43 designating the loose part of the belt. The belt portion indicated by 16 is the part attached elsewhere to the vehicle.

The procedure is this that in the released state the casing 23 does not impose a force on the pin ends 40 positioned adjacent or in engagement with the upper ends of the slots 41. In the case of a tensile force in the belt, the loop 44 thereof is pressed against the W-shaped section 42 resting on the two edges 45, 46 of the slot away from the locking mechanism, so that the belt cannot slide.

If it is necessary to change the length of the portion 16 of the belt so that it must be moved in one direction or in the other direction relative to the circumference of the sleeve 38, one should pull the casing 23 in the direction of arrow 47. As a result the casing will slide over the bearing plate, whereby to cause also the ends 40 of the pin to move in the slots 41 in the direction of arrow 47. The loop 44 is then released from the edge(s) 45, 46 of the slot, and the belt can be lengthened or shortened by pulling 16 or 43, respectively.

The engagement and disengagement of the locking mechanism, as described hereinbefore, involves that for the disengagement the casing 23 must be slid over the bearing plate in the direction of arrow 48. The ends 40 of the pin are not influenced thereby as a result of the location of the slots.

Finally a statement on the assembly. Before the casing is mounted as the last part of the device, a pin is used which is not longer than the length of the base portion 35 of the crossbar. When the casing has been slid over the bearing plate until the slots 41 permit the access of the assembly pin, the latter is pushed out of the sleeve 38 by the definite pin 39 and this pin 39 can be brought into the right position, with the ends 40 extending into the slots 41.

It will be understood that several modifications of the embodiment here described are possible, without departing from the scope of this invention. Thus, as shown in FIGS. 5a, b, the crossbar may be designed as a section 49 in the form of an equilateral triangle, wtih the pin 39 extending along the central longitudinal axis of said section. The length of the belt 16 is being changed not by a sliding of said belt over the sleeve 38 but by a rolling movement of the section, without appreciable sliding of the belt over said section. To strengthen the grip of the section 49 on the belt the ribs 50 of said section may be rounded off obliquely on one side.

I claim:

1. A swiftly releasable locking device, especially adapted to fasten the free end of a safety belt to a fixed support, such as a bow, in a motor vehicle or the like, including a bearing plate with at least one hook-shaped member rotatably mounted thereon, said member being lockable and unlockable by spring-loaded pawl means adapted to swivel on a fixed point on said bearing plate, and including a casing accommodating the mechanism thus formed, which casing can reciprocate relative to said bearing plate in the direction of the belt and is provided with an abutment acting on the free end of said pawl means in the unlocking direction thereof, wherein said hook-shaped member is designed as a rotary wheel with a plurality of equally through specially shaped teeth, of which each time one tooth is in engagement with an inlet slot for the bow in the bearing plate and grips said bow, and the pawl by means of a cam may have a locking action on another tooth, the arrangement being such that the cam of the relevant tooth is released by displacement of the casing in a direction away from the bow and that rotation of the rotary wheel in an opposite sense with respect to the fastening of the end of the belt causes the bow to be released.

2. A locking device as claimed in claim 1, wherein the bearing plate has two spaced walls, with the pawl, the spring loading same, and the rotary wheel mounted within the space between the walls of the bearing plate.

3. A swiftly releasable locking device as claimed in claim 1, wherein the bearing plate has a straight slot for the passage of a folded end of the belt therethrough and said slot has extended therein a crossbar which is in engagement with a W-shaped plate mounted on the edges of the slot facing the belt, and which is movable relative to said slot in the direction of the belt by means of the casing through a lost motion device, the arrangement being such that pulling the casing of the unlocked locking device causes the belt passed over the crossbar to move so as to be lengthened or shortened.

4. A locking device as claimed in claim 3, wherein the casing is provided with two oppositely arranged longitudinal slots into which extend the ends of a pin forming part of the crossbar.

5. A locking device as claimed in claim 4, wherein the crossbar consists of a U-shaped portion the legs of which form guide means for the movement of the crossbar and the transverse base of the U is surrounded by a sleeve of substantially oval-shaped section, which sleeve also clampingly receives said pin.

6. A locking device as claimed in claim 4, wherein the crossbar consists of a section in the form of an equilateral triangle, with the pin extending along the central longitudinal axis of said section.

7. A locking device as claimed in claim 6, wherein the ribs of the section are rounded off obliquely on one side.

8. A locking device as claimed in claim 4, wherein said pin functions as a locking member preventing the casing from sliding off the bearing plate.

References Cited

UNITED STATES PATENTS

| | | |
|---|---|---|
| 612,194 | 10/1898 | Clough. |
| 1,599,087 | 9/1926 | Greve. |
| 3,179,997 | 4/1965 | Jalinaud _____ 24—241 XR |
| 3,293,713 | 12/1966 | Gaylord. |
| 3,378,301 | 4/1968 | Romanzi et al. _____ 297—389 |
| 3,453,701 | 7/1969 | Holmberg _____ 297—389 XR |

FOREIGN PATENTS

| | | |
|---|---|---|
| 1,498,708 | 9/1967 | France. |

DONALD A. GRIFFIN, Primary Examiner

U.S. Cl. X.R.
24—196; 297—389

UNITED STATES PATENT OFFICE
CERTIFICATE OF CORRECTION

Patent No. 3525130            Dated August 25, 1970

Inventor(s) Willem Frans Coenen, Sr.

It is certified that error appears in the above-identified patent and that said Letters Patent are hereby corrected as shown below:

IN THE TITLE:

After "SAFETY", insert -- BELT --.

IN THE DRAWINGS

In the heading of each sheet of Drawings:

After "SAFETY", insert -- BELT --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents